US012747939B2

(12) United States Patent
Kunze et al.

(10) Patent No.: US 12,747,939 B2
(45) Date of Patent: Sep. 29, 2026

(54) CHECKING THE DIMENSIONAL ACCURACY OF A WORKPIECE WITH A SWITCHING TOUCH PROBE

(71) Applicant: Siemens Aktiengesellschaft, Munich (DE)

(72) Inventors: Patrick Kunze, Claussnitz (DE); Kathrin Kunis, Chemnitz (DE); Philipp Lorenz, Wittgensdorf (DE)

(73) Assignee: Siemens Aktiengesellschaft, Munich (DE)

( * ) Notice: Subject to any disclaimer, the term of this patent is extended or adjusted under 35 U.S.C. 154(b) by 356 days.

(21) Appl. No.: 18/626,892

(22) Filed: Apr. 4, 2024

(65) Prior Publication Data

US 2024/0337473 A1 Oct. 10, 2024

(30) Foreign Application Priority Data

Apr. 5, 2023 (EP) .................................... 23166777

(51) Int. Cl.
*G01B 5/20* (2006.01)
*G01B 3/14* (2006.01)

(52) U.S. Cl.
CPC *G01B 5/20* (2013.01); *G01B 3/14* (2013.01)

(58) Field of Classification Search
CPC ............. G01B 5/20; G01B 3/14; B23Q 17/20
See application file for complete search history.

(56) References Cited

U.S. PATENT DOCUMENTS 5,419,222 A * 5/1995 Bieg .................... G05B 19/401 409/218
6,019,001 A * 2/2000 Schreiner ............... G01N 29/27 73/621
7,024,333 B2 * 4/2006 Rogele ................. G05B 19/401 702/33
7,194,378 B2 * 3/2007 Gorsch ................ G01B 21/045 702/155
7,610,162 B2 * 10/2009 Grupp .................. G01B 21/042 700/60
7,640,674 B2 * 1/2010 Ferrari ................. G01B 21/042 33/502
7,661,328 B2 * 2/2010 Janz ....................... G01D 11/30 73/866.5

(Continued)

FOREIGN PATENT DOCUMENTS

EP 4152111 A1 3/2023
JP 2013094899 A * 5/2013

(Continued)

*Primary Examiner* — Yaritza Guadalupe-Mccall
(74) *Attorney, Agent, or Firm* — Henry M. Feiereisen LLC

(57) ABSTRACT

In a method for checking a contour of a workpiece, a tactile switching touch probe with a shaped probe element is clamped in a machine tool and connected to a control facility. The touch probe is guided, preferably multiple times, with a different distance or different deflection of the touch probe, along a nominal contour of the workpiece. It is checked whether the touch probe generates a switching signal or loses a switching signal, indicating to a contour deviation. A machine tool and a simulation tool constructed as a digital twin are also disclosed. This enables a fast, simple and cost-effective check of the dimensional accuracy of workpieces machined or produced in the machine tool.

19 Claims, 7 Drawing Sheets

(56) References Cited

U.S. PATENT DOCUMENTS

| | | | | |
|---|---|---|---|---|
| 7,752,766 | B2 * | 7/2010 | Ruck | G01B 21/045<br>33/503 |
| 8,336,219 | B2 * | 12/2012 | Grzesiak | G01B 21/042<br>33/502 |
| 9,250,053 | B2 * | 2/2016 | Hirano | G01B 5/016 |
| 9,976,852 | B2 * | 5/2018 | Kelley | G01B 21/04 |
| 10,962,361 | B2 * | 3/2021 | Iseli | G01B 5/0014 |
| 11,162,776 | B2 * | 11/2021 | Holzapfel | G01B 11/26 |
| 11,733,021 | B2 * | 8/2023 | Keehnel | G01B 11/007<br>33/503 |
| 2014/0059872 | A1 * | 3/2014 | Nakagawa | G01B 5/008<br>33/502 |
| 2015/0204653 | A1 * | 7/2015 | Przygodda | G01B 21/045<br>33/503 |
| 2018/0029186 | A1 | 2/2018 | Röders et al. | |
| 2019/0004092 | A1 * | 1/2019 | Hemmings | G01B 5/008 |
| 2019/0187661 | A1 * | 6/2019 | Yanaka | G01B 9/02071 |
| 2023/0088649 | A1 * | 3/2023 | Zimmermann | G05B 19/402<br>700/192 |
| 2024/0238924 | A1 * | 7/2024 | Yamamoto | B23Q 5/043 |
| 2024/0337473 | A1 * | 10/2024 | Kunze | G01B 5/20 |

FOREIGN PATENT DOCUMENTS

| | | | |
|---|---|---|---|
| WO | WO 2016128074 | A1 | 8/2016 |
| WO | WO 2018128074 | A1 | 8/2018 |

* cited by examiner

CHECKING THE DIMENSIONAL ACCURACY OF A WORKPIECE WITH A SWITCHING TOUCH PROBE

CROSS-REFERENCES TO RELATED APPLICATIONS

This application claims the priority of European Patent Application, Serial No. 23166777.5, filed Apr. 5, 2023, pursuant to 35 U.S.C. 119(a)-(d), the content of which is incorporated herein by reference in its entirety as if fully set forth herein.

BACKGROUND OF THE INVENTION

The present invention relates to a method for checking a contour of a workpiece by means of a machine tool connected to a control facility, wherein a switching touch probe is clamped into the machine tool.

The present invention further relates to a machine tool system for checking a contour of a workpiece, with a machine tool for machining of the workpiece, a control facility connected to the machine tool as well as a switching touch probe with a shaped probe element clamped into a tool receptacle of the machine tool.

Furthermore, the present invention relates to a digital twin of a machine tool system for simulation of a method for checking a contour of a workpiece by means of a machine tool connected to a control facility, into which a switching touch probe with a shaped probe element is clamped.

Various methods and the use of different means of measurement are known for checking the dimensional accuracy of workpieces. Frequently here there is recourse to measurement machines or coordinate measurement systems or coordinate measurement devices set up separately for the measurement of workpieces. These frequently comprise measuring, tactile or optical distance measurement systems, in which not only a contact, but also a deflection of the measurement system or a distance between measurement system and measurement object can be detected.

Frequently tactile touch probes which can be detachably connected to the measuring machine are used for measurement of workpieces, in which, for detection of measured values, a shaped probe element, as a rule a measuring sphere, a measuring cylinder or a measuring tip, touches the workpiece at the point of the workpiece surface to be measured. Measuring, tactile touch probes have their own internal measurement range, as a rule of a few millimeters. The internally measured sensor value in this case is overlaid with the position of the touch probe at the respective measuring point derived from the axis values of the measuring machine. The disadvantage of these types of measuring system however is that said systems are relatively expensive and furthermore resources (computing power, corresponding software for detection and evaluation of the measured values etc.) must be present in the measuring machine.

In addition, switching touch probes which, when recording a measuring point merely deliver a switching signal (trigger signal) which initiates the reading-out of the current axis values of the machine, are also known when there is a contact with the measurement object. Switching touch probes are, as a rule, simpler in their design and therefore cost less than measuring touch probes. In a similar way to measuring tactile touch probes, switching tactile touch probes also as a rule allow a deflection, just that the value of the deflection is not detected in the switching touch probes.

Machine tools for machining workpieces are known in which a tool clamped into the machine tool is moved by means of at least one position-controlled axis comprised by the machine tool relative to the workpiece—as a rule likewise clamped into the machine tool. The position-controlled axis is controlled by means of a control facility connected to the machine tool, usually a numerical controller. Robots can also be embodied as machine tools.

Furthermore it is known that the measurement of workpieces can be carried out directly by means a machine tool that has been used beforehand for machining of the workpiece. To this end a touch probe suitable for this is clamped into the tool receptacle of the machine tool.

It would therefore be desirable and advantageous to o obviate prior art shortcomings by checking in a fast, simple and low-cost way a dimensional accuracy of workpieces machined or produced in a machine tool.

SUMMARY OF THE INVENTION

According to one aspect of the present invention, in a method for checking a contour of a workpiece by means a machine tool connected to a control facility, a switching touch probe is clamped into the machine tool, wherein the touch probe has a shaped probe element at its end facing toward the workpiece, wherein the shaped probe element is able to be positioned relative to the workpiece by means of at least one position-controlled axis of the machine tool, wherein data regarding a nominal contour of the workpiece for at least one area of the surface of the workpiece, a first distance value, which characterizes a distance between the shaped probe element and the nominal contour, as well as a first deflection value, which characterizes a deflection of the touch probe when it comes into contact with the surface of the workpiece, is stored in the control facility. The control facility establishes from the data regarding the nominal contour, the distance value and the deflection value at least one first distance path as well as at least one first deflection path, which can be specified to the shaped probe element of the touch probe as the movement path, wherein the shaped probe element of the touch probe is moved along the first distance path, wherein the first deflection path is specified as the movement path to the shaped probe element of the touch probe and the touch probe is moved. The control facility determines a violation of the nominal contour when the shaped probe element of the touch probe, when it is moving along the first distance path, touches the workpiece at at least one point of the first distance path and, as a result, the touch probe generates a switching signal and/or, when the touch probe is moved with the predetermined first deflection path. When the shaped probe element of the touch probe does not touch the workpiece at at least one point of the first distance path, the touch probe does not generate a switching signal.

According to another aspect of the invention, a machine tool system for checking a contour of a workpiece includes a machine tool for machining the workpiece, a control facility connected to the machine and a switching touch probe with a shaped probe element clamped in a tool receptacle of the machine, wherein the control facility causes the machine tool system to execute the aforedescribed method.

According to yet another aspect of the invention, a digital twin of a machine tool system simulates the aforedescribed method for checking a contour of a workpiece by means of a machine tool connected to a control facility, into which a switching touch probe with a shaped probe element is clamped.

The invention offers the advantage that a machine tool used for machining of the workpiece, which comprises at least one position-controlled axis, is also used after the machining for measurement of the workpiece. Instead of a tool a tactile switching touch probe is then inserted into the tool receptacle of the machine tool and thus a specific contour to be checked along the workpiece surface is traced.

The invention provides for the use of a switching touch probe, which delivers a switching signal on contact with (when it touches) the measurement object (workpiece). The switching signal is usually maintained until contact between the touch probe and the workpiece ends. Switching touch probes are simpler in their design than measuring touch probes and are as a rule therefore lower-cost.

The invention further offers the advantage that, through the use of a switching touch probe directly in the machine tool with which the workpiece has also been machined in the machine tool, it is possible to dispense with a measuring machine provided separately for measurement of workpieces. Re-clamping of the workpiece is thus not required. This saves time and money.

Moreover, no additional, expensive measuring software is required for detection and evaluation of the measured values. The detection and evaluation of the switching signal can therefore be undertaken by means of the control facility of the machine tool.

The invention further offers the advantage that, with the touch probe used, a plurality of individual points does not have to be moved to, but a complete contour on the workpiece surface is traced in each case. This shortens the period of time needed for measurement.

Advantageously, the dimensional accuracy of a workpiece may be checked by traversing a specific contour (nominal contour) of the workpiece surface at least twice. Data regarding the nominal contour can be derived from the finished machined workpiece or from a CAD file and is thus available in the control facility.

Initially, a specific distance value is defined in the control facility. Thereafter a distance path is established automatically by means of the control facility, which runs at the distance, defined by the distance value, parallel to the nominal contour. Subsequently, the touch probe, in particular a shaped probe element of the touch probe, is moved along the predetermined distance path relative to the workpiece for measurement (for recording of measuring points). In this case the distance value specifies the distance between the nominal contour and the distance path, in particular in respect of a predeterminable direction, in particular in respect of the surface normal along the nominal contour. In the ideal case the shaped probe element would always move in this way in relation to the nominal contour offset (spaced apart) by the distance value along the predetermined distance path. The distance value thus in particular defines a tolerance, which predetermines a permitted deviation (oversize) of an actual contour from the nominal contour.

If the contour errors present in the workpiece lies within this tolerance, then the touch probe, when tracing the contour along the predetermined distance path, will not touch the workpiece surface and the touch probe will therefore not switch, i.e. it will not deliver a switching signal.

However, if the touch probe switches, then the actual contour is violating the permitted tolerance and there is oversize.

Furthermore a deflection value can be stored in the control facility. The control facility can automatically establish a deflection path with the aid of the deflection value. In this case the deflection value specifies the distance between the nominal contour and the deflection path, in particular in respect of a predeterminable direction, in particular in respect of the surface normal along the nominal contour. Unlike the distance path however the deflection path runs in the workpiece, that is below the workpiece surface. If the deflection path is now specified to the shaped probe element of the touch probe, then in the ideal case the shaped probe element would move along the nominal contour and would always do this with the touch probe deflected by the deflection value. The deflection value thus in particular defines a tolerance, which predetermines a permitted deviation (undersize) of an actual contour from the nominal contour.

Thus, in the ideal case the predetermined deflection value and thus the predetermined deflection of the touch probe would remain unchanged for the entire movement along the deflection path. If however the switching signal is lost during the movement along the deflection path, i.e. the deflection becomes zero, then the deviation of the actual contour from the nominal contour exceeds the predetermined deflection value and there is undersize.

The dimensional accuracy of the workpiece within the predetermined tolerance is only given for the examined contour when both during the first measurement run no switching signal is registered and also during the second measurement run a switching signal present at the beginning of the measurement run is not lost during the movement along the predetermined path.

Advantageously, provision may be made for at least one contour of the workpiece, i.e. a curve describing a surface of the workpiece. Naturally it is possible for a workpiece only to be classified as "good" when the surface is checked at a number of places in accordance with the method described and for the tolerance values to be adhered to overall (for all contours checked).

For the case in which the control facility determines a violation of the nominal contour when carrying out the inventive method, a number of options exist for how the control facility handles this situation. Thus the control facility might output a corresponding message to a user interface of the control facility. The control facility can further store data relating to this in a memory of the control facility or transfer it to an external computing facility. Furthermore the control facility can also assign the position on the workpiece surface, at which the oversize or undersize was established, to the data.

According to another advantageous feature of the invention, the same value may be set as the first distance value and as the first deflection value. This means that the distance value and the deflection value have the same value or amount (for example in μm). Thus only one (tolerance) value has to be predetermined. The same tolerance is accordingly permitted for an oversize and also for an undersize.

According to another advantageous feature of the invention, different values for the first distance value and for the first deflection value may be set, so that the nominal contour is first traced at least once along the predetermined distance path at the distance predetermined by the first distance value with the shaped probe element and subsequently the nominal contour is traced at least once along the predetermined deflection path at the distance predetermined by the first deflection value with the touch probe, deflected toward the nominal contour, with the shaped probe element. Thus different tolerances can be predetermined for the oversize and the undersize.

Advantageously, checking of the contour may be preceded by machining the workpiece with the machine tool, in other words the same machine tool is used both for machining of the workpiece and also for subsequent checking of its dimensional accuracy. Frequently in such cases the workpiece can remain clamped in its last position present in the machine tool for measuring. This saves on an additional measuring machine and also saves the time needed for a second or changed clamping.

Besides the distance value per se, there are also different options with regard to the direction of the distance. Accordingly, the first distance value and/or the first deflection value may be set with regard to a predeterminable direction, in particular an axis direction of the machine tool or an axis direction of a machine coordinate system. For example a distance in the Z direction can be predetermined in this way. This is advantageous in particular with workpieces with a surface running at least essentially planar, in parallel to the X-Y plane. In principle a surface normal of a surface in question can be aligned however in any way in the space or in any way in a machine coordinate system. Advantageously, the touch probe is oriented in the same direction during the measurement, with regard to which the distance value or the deflection value has also been predetermined.

According to another advantageous feature of the invention, the first distance value and/or the first deflection value may be set with regard to a respective surface normal of the nominal contour of the workpiece along the predetermined paths (distance path, deflection path). This is advantageous in particular for workpieces with a curved course of the surface. The probe element is thereby ideally always distanced equally far from the surface of the workpiece, or the touch probe is always deflected by the same distance, even with an uneven workpiece surface aligned in any given way in the space.

Advantageously, the orientation of the touch probe during its movement along the predetermined path on the surface of the workpiece, in particular the surface normal of the workpiece at the respective measuring point, can be adjusted. The touch probe is thus preferably always aligned at right angles to the surface at the respective measuring point. This increases the quality of the respective measurement.

In order to further shorten the measuring process, the distance path is advantageously traced along a positive path direction and subsequently the deflection path is traced along a negative path direction. This means that for checking in respect of an oversize and, following on from this, for checking in respect of an undersize, the touch probe is guided successively in different directions of movement along the nominal contour. The periods of time in which no measurement is taking place are thus reduced to a minimum.

According to another advantageous feature of the invention, the nominal contour may be traced a number of times along a number of predetermined distance paths with different distances, predetermined by different distance values, between workpiece surface and shaped probe element.

Similarly the nominal contour may advantageously be traced a number of times along a number of predetermined deflection paths with different deflections, predetermined by different deflection values, with the touch probe deflected toward the nominal contour.

In this embodiment, when the shaped probe element is moved along the first distance path with the distance predetermined by the first distance value, for a contact between the shaped probe element and the workpiece to be registered at a point of the first distance path, the distance between the shaped probe element and the nominal contour may be increased to a predetermined second distance value and for the shaped probe element may be moved along a second distance path with the distance to the nominal contour predetermined by the second distance value.

Advantageously, the distance between the shaped probe element and the nominal contour may be increased to a further predetermined distance value for each further contact between the shaped probe element and the workpiece and the shaped probe element is moved along a further distance path with the distance predetermined by the further distance value to the nominal contour until such time as the end of the nominal contour to be traced is reached.

Furthermore, the second or the last applicable distance value may advantageously be stored as oversize of the workpiece in the control facility.

According to another advantageous feature of the invention, provision may be made for the case in which the touch probe, when tracing the nominal contour with the deflection predetermined by the first deflection value, loses its switching signal at a first point of the nominal contour, the deflection of the touch probe with regard to the nominal contour may be increased to a predetermined second deflection value and the nominal contour may be further traced with the deflection, predetermined by the second deflection value, of the touch probe.

Advantageously, with each further loss of the switching signal, the deflection of the touch probe with regard to the nominal contour may be increased to a further predetermined deflection value and the nominal contour may be further traced with the deflection predetermined by the respective further deflection value until such time as the end of the nominal contour to be traced is reached.

Furthermore the second or the last applicable deflection value may advantageously be stored in the control facility as undersize of the workpiece.

The maximum possible deflection of the touch probe (as a rule in the mm range) and the deviations detected with the touch probe between the required dimension and the actual dimension of the workpiece (as a rule in the μm range) differ from one another typically by orders of magnitude, so that damage to the touch probe when measuring the actual contour can usually be prevented.

In order, despite this, to prevent damage to the touch probe due to a steep rise in the contour in the last mentioned form of embodiment, various measures are possible.

Thus a tactile switching touch probe can be provided that not only delivers a switching signal on contact, but which generates a further switching signal when the maximum deflection of the touch probe is reached. If the controller identifies the further switching signal, then the touch probe is withdrawn by a specific amount, for example far enough for the first switching signal to be lost as well.

Another measure involves in the next larger deflection value not being set immediately when the switching signal is lost, but the position at which the touch probe loses the switching signal being stored and the completely deflected touch probe initially being moved further along the predetermined deflection path either until the end of the predetermined deflection path is reached or the touch probe switches once again in a second position. Subsequently the touch probe is moved back to the stored position and only thereafter is the next larger deflection value set. On reaching the second position, the touch probe is withdrawn by a specific amount and only moved further along the predetermined path, possibly until a switching signal is registered once again. Overall the touch probe is also moved in this way over a profile with comparatively large heights (higher areas) and depths (lower areas) without any damage.

According to another advantageous feature of the invention, it is possible to initially start with relatively large distance values or deflection values and to successively reduce these after each measurement run, until such time as the touch probe switches or loses the switching signal. In this way the precise extent of the deviation of the actual contour from the nominal contour can be well contained.

Conversely, the process can also initially be started with very small distance values or deflection values and subsequently the distance values or deflection values, after a detected contour violation, are successively increased step-by-step until such time as no contour violation is established any longer. This variant also serves to contain the extent of the contour deviation more precisely, wherein, depending on the respective circumstances, using this variant once and using the above-mentioned variant once can produce results more quickly.

Advantageously, the values of the first and/or second distance values or of their increments or decrements for consecutive passes can be stored in the control facility. In this case the same difference can be specified in each case between neighboring values, but other graduations are also conceivable. In particular the differences can be all the smaller, the closer the touch probe is moved to the nominal contour. In this way it can initially be quickly established whether rough deviations exist between the required and the actual contour and subsequently the available tolerances can be specified very precisely.

Advantageously, the control facility can automatically determine the distance or deflection paths based thereon with the aid the respective distance or deflection values.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
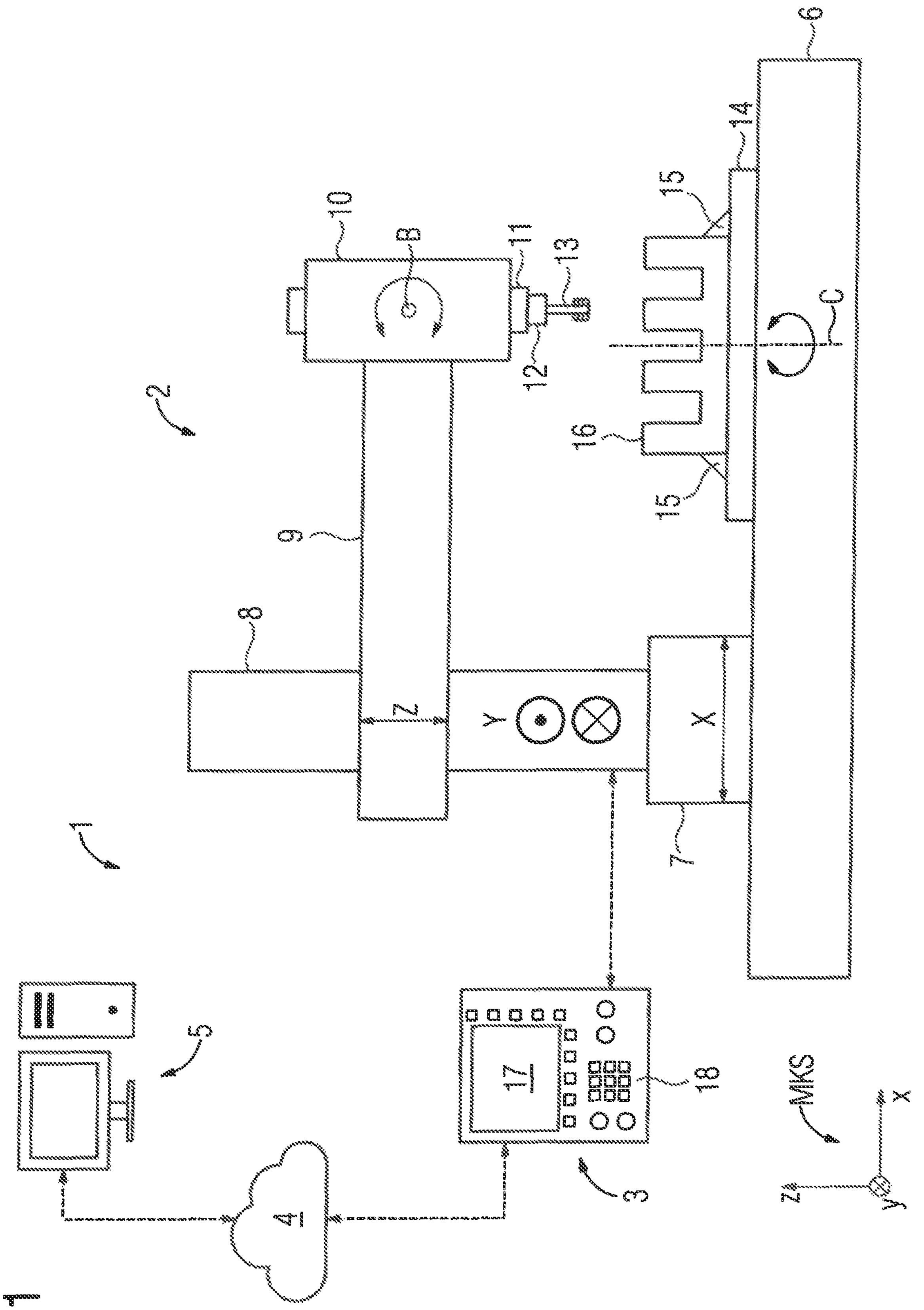
FIG. 1 shows a machine tool system for carrying out an method according to the invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic diagram of a machine system in the form of a machine tool system 1. The machine tool system 1 includes a machine in the form of a machine tool 2. The machine tool system 1 further includes a numerical control facility, connected to the machine tool 2, in the form of a CNC controller 3 for control of the machine tool 2*a*. Furthermore, the machine tool system 1 includes an external computing facility in the form of a CAD/CAM systems 5 connected via a network 4, for example the Internet.

The machine tool 2 shown has three position-controlled linear axes X, Y and Z, wherein a first carrier element 7 can be adjusted in the x direction, a second carrier element 8 in the y direction and a third carrier element 9 in the z direction in relation to a machine coordinate system MKS in a fixed position in relation to the machine tool 2.

The first carrier element 7 is connected via a linear drive (not shown) adjustable in the x direction to a stationary machine frame 6, the second carrier element 8 is connected via a linear drive (not shown) adjustable in the y direction to the first carrier element 7 and the third carrier element 9 is connected via a linear drive (not shown) adjustable in the z direction to the second carrier element 8.

The third carrier element 9 carries a spindle drive 10, which in its turn is able to be pivoted about a position-controlled round axis B parallel to the Y axis. The spindle drive 10 for its part has a speed and/or position-controlled tool spindle 11 able to be rotated about a spindle axis (not shown), into which a tool holder 12 with the tool 13 attached to it is clamped.

Furthermore, the machine tool 2 includes a position-controlled tool table axis C aligned parallel to the Z axis, about which a workpiece table 14 can be rotated.

The workpiece table 14 is likewise connected to the stationary machine frame 6 and a workpiece 16 is attached by means of the tool holder 15 to the workpiece table 14.

Accordingly, the machine tool 2, within the framework of the exemplary embodiment, has five position-controlled machine axes, through which a relative movement between the tool 13, which is present within the framework of the exemplary embodiment in the form of a milling tool, and the workpiece 16 can be carried out. Thus this involves what is known as a 5-axis machine tool (5-axis machine), wherein it should be noted at this point that a machine tool can of course have more, but also fewer than five machine axes. The drives of the position-controlled machine axes have not been shown in the exemplary embodiment on the grounds of improved clarity.

The machine tool 2 is connected to the CNC controller 3, which, with the aid of a parts program and/or a manual operator input, establishes required movement values for the machine axes for control of a relative movement taking place between the tool 13 and the workpiece 16. The CNC controller 3 establishes the required movement values in particular with the aid of the parts program, in which the movements to be carried out by the tool 13 relative to the workpiece 16 are defined in the form of commands or program instructions, as a rule in the form of G code.

Alternatively or in addition, the movement of the tool 13 and/or the workpiece 16 can also be predetermined by means of a manual input via an operator facility with operating elements 18 in conjunction with a display apparatus in the form of a display 17 of the CNC controller 3 by an operator on site at the machine tool 2. The operating elements 18 in particular include pushbuttons or rotary controls. Advantageously the display 17 can also be embodied as a touchscreen and thus likewise as an operating element.

From the CNC controller's point of view, the parts program is usually created in an external computing facility, in the exemplary embodiment the CAD/CAM system 5 and a post processor (not shown) outside of the CNC controller 3 possibly connected downstream of the CAD/CAM system and is transmitted from there, in particular via the network 4, to the CNC controller 3.

When processing the parts program the CNC controller 3, in a specific clock pulse, the interpolation clock, generates required position values x, y and z for the linear axes as well as required angular values p and y (not shown) for the round axes B and C. Through these required movement values the tool 13 is moved with a predetermined orientation relative to the workpiece 16 along a movement track (track).

In addition to the pure required position values, the dynamics of the relative movement or of the variables relating to the individual axes, in particular the speed, the acceleration or the jerk, can also be established or set by means of the numerical control facility.

As has already been described above, the parts program for machining of the workpiece is as a rule derived from a CAD file. The workpiece is described exactly by the CAD file, in particular in respect of its dimensions and features.

For checking the quality of a workpiece it is usual to check the dimensions and features of the workpiece after the machining, in particular with the aid of measurements.

Thus the invention makes provision that, after a machining of the workpiece 16, in particular after its completion, instead of the tool, a touch probe 21 (cf. FIGS. 2 to 7) is clamped into the tool spindle 11 or the tool holder 12, where necessary with a tool adapter (not shown) of the machine tool 2 between the two. In accordance with the invention a switching, tactile touch probe 21 is provided for this, which on contact of the touch probe 21, in particular of a shaped probe element 22 at the end of the touch probe 21, generates a switching signal. The switching signal is maintained in this case until such time as the contact between the touch probe 21 and the workpiece 16 is lost again.

Figure 2:
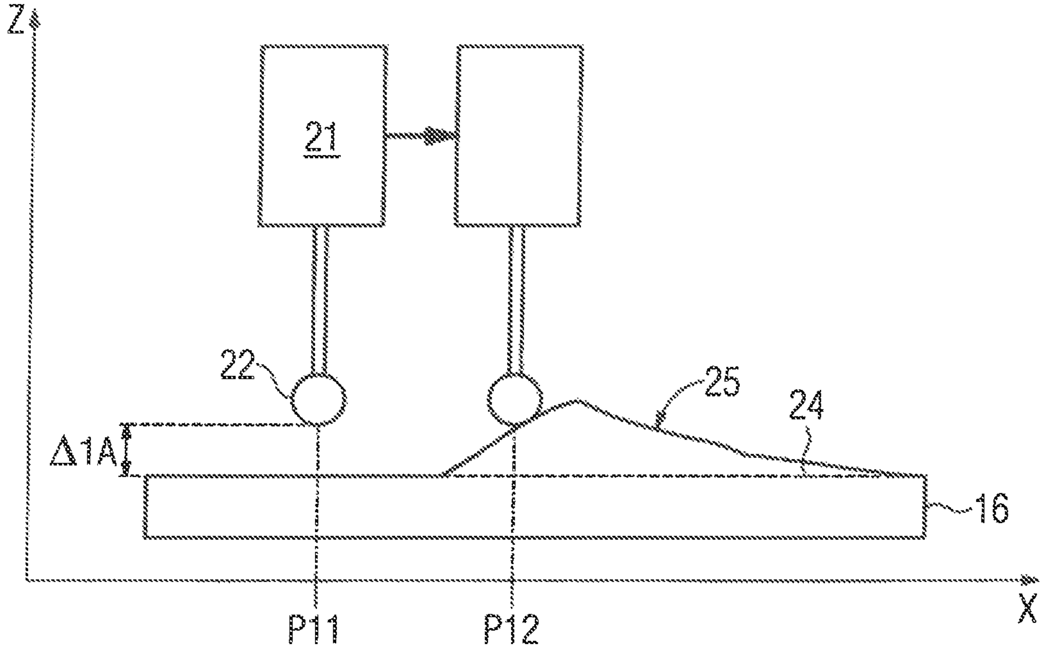
FIG. 2 shows the establishment of a contour deviation in the form of an oversize.

FIG. 2 now describes the case in which the switching touch probe 21, at the end of which a shaped probe element in the form of a measuring sphere 22 is located, is moved along a distance path (a track), in the exemplary embodiment from left to right, along (parallel to) the nominal contour 24 of the workpiece 16. Stored in the CNC controller 3 is here a distance value Δ1A, which predetermines a desired distance between the surface of the workpiece 16 and the measuring sphere 22 for this movement. In the exemplary embodiment the distance value Δ1A designates a distance in the Z direction with regard to a machine coordinate system MKS. Similarly the distance value could be oriented with regard to another direction able to be oriented in any given way in the space, in particular a surface normal of the workpiece 16 at the respective measuring point.

From the distance value Δ1A stored in the CNC controller 3 and the nominal contour 24 to be measured the CNC controller 3 establishes a distance path, which runs at the distance Δ1A in parallel to the nominal contour 24. The distance path is specified to the measuring sphere 22 as the path or track and the measuring sphere 22 is moved along this track.

In the exemplary embodiment the surface of the workpiece 16 is ideally to be flat in the sketched area in accordance with its nominal contour 24. As can likewise be seen from the drawing, the surface of the workpiece 16, in the area shown, however has a higher area 25 with a deviation Δ1A (oversize) compared to a required dimension. The actual contour thus deviates in the area shown significantly from the nominal contour 24.

If now, in the exemplary embodiment in accordance with FIG. 2, the touch probe 21 is guided from the position P11 at the distance Δ1A from the nominal contour 24 in the X direction (from left to right) over the surface of the workpiece 16, then measuring sphere 22 touches the higher area 25 at the position P12, as a result of which a switching signal is triggered at the touch probe 21. Through the switching signal the CNC controller 3 detects at the position P12 an oversize on the surface of the workpiece 16, which exceeds the predetermined distance value Δ1A. Where necessary it is thereby identified that the workpiece 16 does not meet with the predetermined quality requirements.

In a similar way to the identification of an unwanted higher area 25 in accordance with FIG. 2, an explanation is given below with the aid of the example in accordance with FIG. 3 as to how an unwanted lower area 26 of the nominal contour 24 is identified on the surface of the workpiece 16. Here too a distance to the nominal contour 24, in the exemplary embodiment the deflection value Δ1U, is first predetermined. Unlike in the exemplary embodiment shown previously, the touch probe 21 is first moved here in the (negative) Z direction toward the workpiece 16 until the measuring sphere 22 touches the surface of the workpiece 16 and the touch probe 21 generates a switching signal. Subsequently the touch probe 21 is moved further in the negative Z direction by the value Δ1U. In this case, the holder for the spring-loaded measuring sphere 22 is retracted into the housing of the touch probe 21 by the corresponding value. The touch probe 21 is thus deflected by the deflection value Δ1U. Touch probes that permit such a spring travel (deflection value) of up to a few millimeters are conventional.

From the deflection value Δ1U stored in the CNC controller 3 and the nominal contour 24 to be measured the CNC controller 3 establishes a deflection path, which runs at the distance Δ1A in parallel to the nominal contour 24, with the difference that the deflection path (unlike the distance path) now runs within the workpiece 16. If the deflection path is specified to the measuring sphere 22 as the path or track, then the deflected measuring sphere 22 now moves along the surface (actual contour) of the workpiece 16.

If now, similarly to the exemplary embodiment in accordance with FIG. 2, the touch probe 21 is moved again in the X direction (from left to right) along the deflection path then this leads, with the touch probe 21 at the position P22 in the area of the depression 26, initially reducing the deflection of the touch probe 21, until finally, at the position P23 the measuring sphere 22 of the now no longer deflected touch probe 21 loses contact with the workpiece 16. The depression 26 thus exceeds the value Δ1U and the touch probe 21 loses its switching signal.

Figure 3:
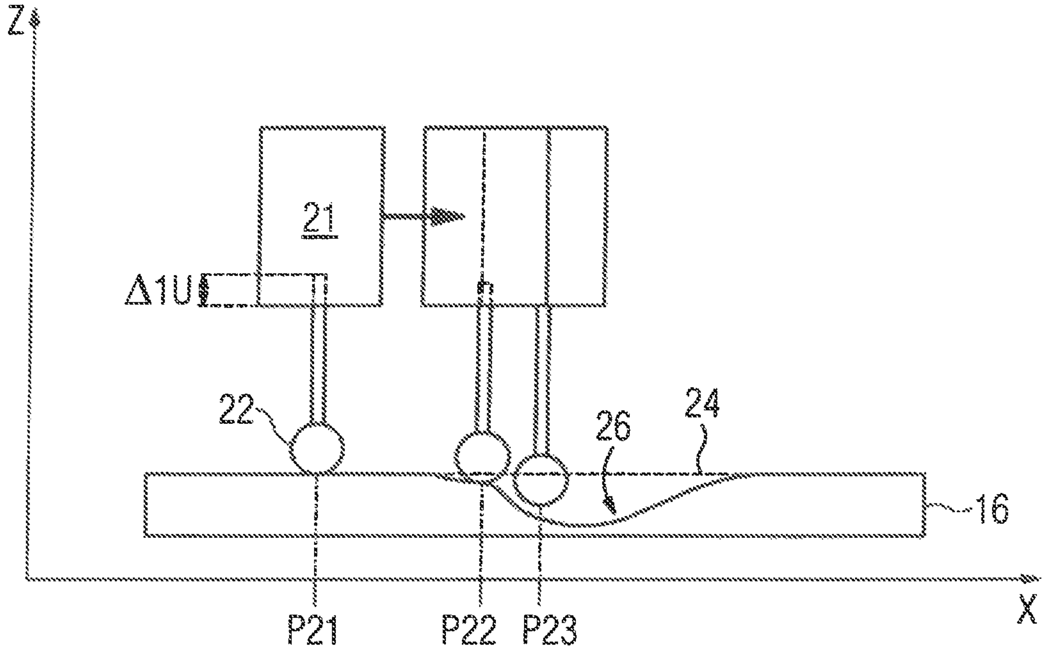
FIG. 3 shows the establishment of a contour deviation in the form of an undersize.

Here too, the CNC controller 3 (see FIG. 1), namely through the absence of the switching signal, can establish an unwanted deviation of the actual contour from the nominal contour 24, the value of which exceeds the value Δ1U in the exemplary embodiment in accordance with FIG. 3.

Advantageously, in the measurement of the workpiece 16 first of all the variant described in FIG. 2 and, subsequently the variant described in FIG. 3 is carried out. This enables too significant a deflection and possibly damage to the touch probe 21 resulting therefrom to be prevented.

In the exemplary embodiments in accordance with figures FIG. 2 and FIG. 3, the nominal contour 24 of the workpiece 16 runs in parallel to the X axis. Naturally the inventive method is also able to be transferred by analogy to any given workpiece surfaces aligned in the space.

Figure 4:
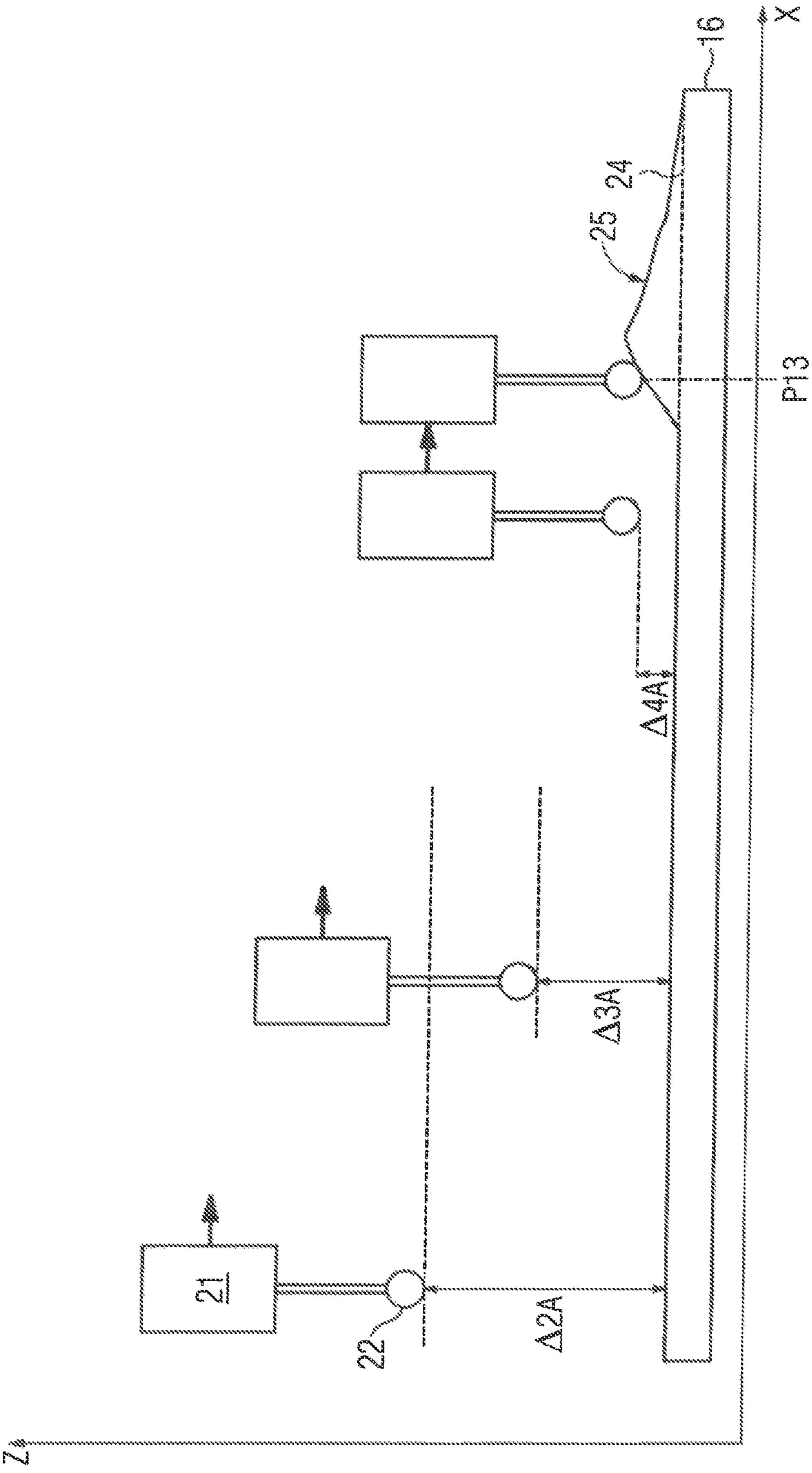
FIG. 4 shows the determination of an oversize.
Figure 5:
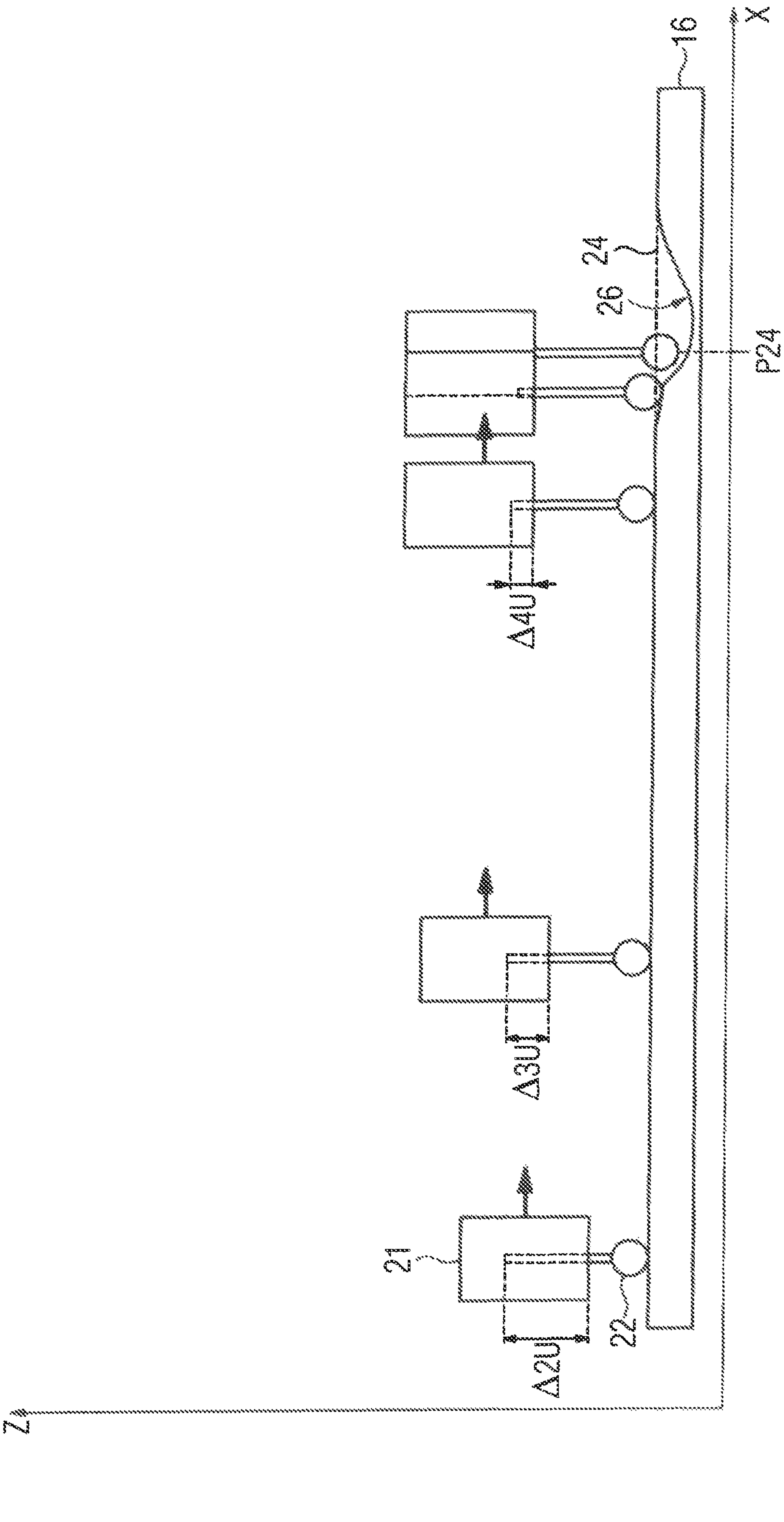
FIG. 5 shows the determination of an undersize.

The exemplary embodiments in accordance with figures FIG. 4 and FIG. 5 illustrate how, by means of the invention, the value of a contour error can be contained and thus can be established comparatively precisely. For this purpose, in the exemplary embodiment in accordance with FIG. 4, a contour error in the form of a higher area is probed step-by-step 25, by the touch probe 21 first of all being used to trace the nominal contour 24 at a second distance Δ2A along a second distance path. If in this case contact occurs between the workpiece 16 and the measuring sphere 22, then the touch probe 21 switches. If on the other hand—as in the exemplary embodiment—there is no contact, then the touch probe 21 does not switch and the CNC controller 3 identifies that no higher area that exceeds the value Δ2A is present along the second distance path examined. In the next step the distance between the nominal contour 24 and the measuring sphere 22 is reduced, in the example to the third distance value Δ3A. With this distance the nominal contour 24 is again traced along a third distance path. Here too this again does not result in any contact in the exemplary embodiment. Only after the distance in the exemplary embodiment has been reduced to the fourth distance value Δ4A and the measuring sphere 22 is moved along the fourth distance path resulting therefrom, does the measuring sphere 22 touch the surface of the workpiece 16, namely at the position P13. The CNC controller 3 thus identifies that a higher area 25, which exceeds the value Δ4A, is present at this point P13.

The search for unwanted lower areas is undertaken in a similar way. For this purpose the touch probe 21 is first deflected relatively far, in the exemplary embodiment by the value Δ2U, and a second deflection path resulting therefrom is specified to the measuring sphere 22 as its movement path. If the touch probe 21 does not lose its switching signal during the movement, then the CNC controller 3 identifies from this that no depression is present, the depth of which exceeds the value Δ2U. Thereafter the deflection is reduced step by step until the touch probe 21 finally loses its switching signal. In the exemplary embodiment, this is still not the case with the deflection Δ3U and the third deflection path resulting therefrom, but with the deflection Δ4U and the movement that stems from the resulting fourth deflection path. Here the measuring sphere 22, at the position P24, loses contact with the workpiece surface and as a result the touch probe 21 loses its switching signal. Through this the CNC controller 3 identifies that a depression 26 is present at the position P24, the value of which depression exceeds the value Δ4U.

Figures 6A, 6B, 6C, 6D:
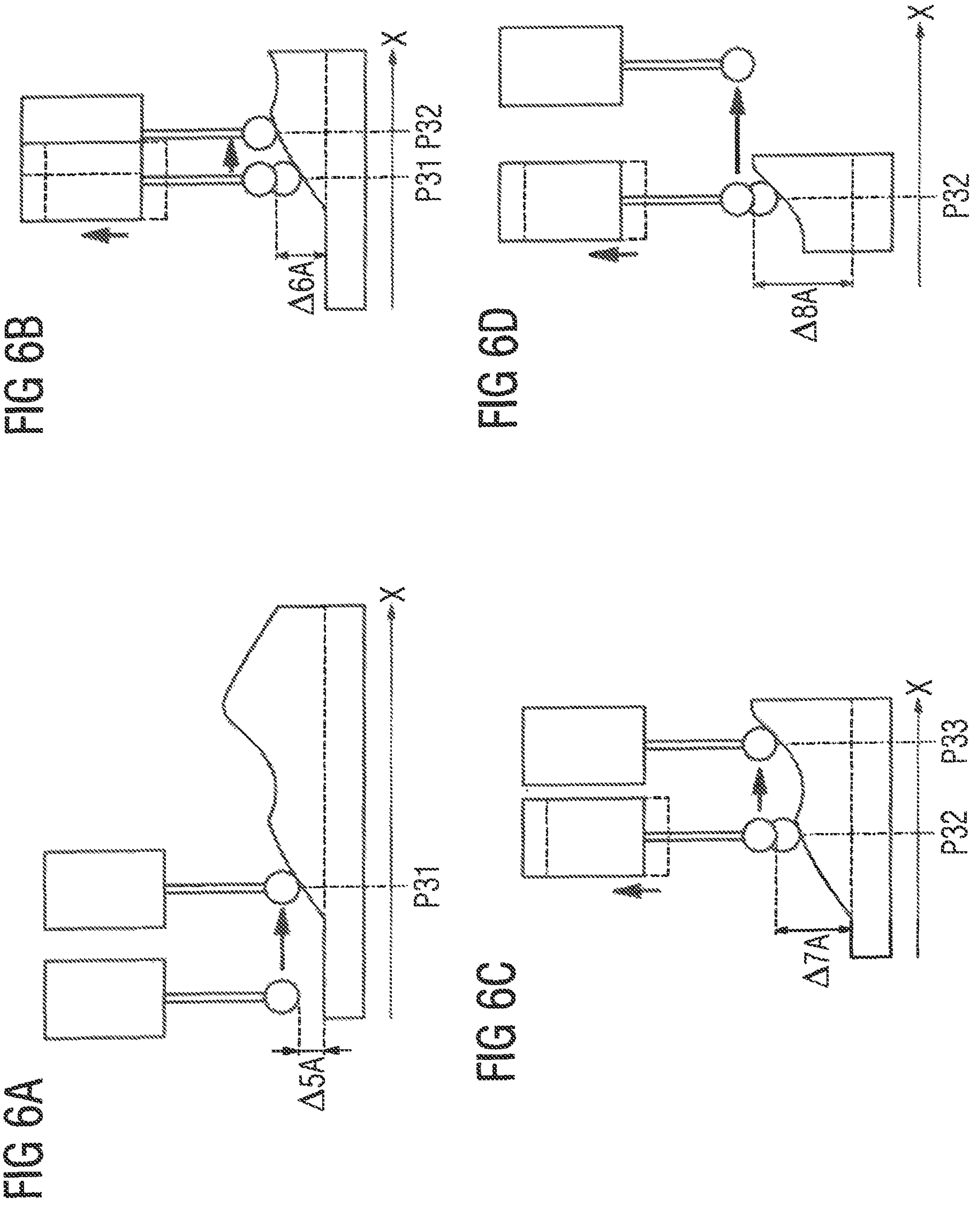
FIGS. 6A-6D show the determination of an oversize with consecutively increasing distance values.

FIGS. 6A to 6D show a further form of embodiment of the invention. Similarly to the form of embodiment in accordance with FIG. 2, here too a fifth distance value Δ5A is initially predetermined, from which the CNC controller 3 establishes a fifth distance path. If now, as can be seen in FIG. 6A, at the position P31, contact between the measurement head 22 and the surface of the workpiece 16 is established, by a switching signal being triggered at the touch probe 21, then automatically a new sixth distance value Δ6A stored in the CNC controller 3 is automatically set at the touch probe 21 (FIG. 6B). Subsequently the touch probe 21 is moved with the new distance value Δ6A further along the sixth distance path resulting therefrom along (in parallel to) the nominal contour 24. If in this case a contact between the measuring head 22 and the surface of the workpiece 16 is registered once again, in the exemplary embodiment shown in FIG. 6B, at the position P32, then the distance between the surface of the workpiece 16 and the touch probe 21 is increased a further time, by a distance value Δ7A increased further by comparison with the distance value Δ6A (FIG. 6C) and stored in the CNC controller 3 being set automatically and the measuring sphere 22 being moved further along a seventh distance path resulting therefrom. The last method steps shown are repeated until such time as no further contact between the measuring sphere 22 and the surface of the workpiece 16 is registered. In the exemplary embodiment this is still not the case at the distance value Δ7A, but at the distance value Δ8A. The last distance value Δ8A set, at which the touch probe 21 no longer switches (FIG. 6D), thus delivers the dimension of the deviation (oversize) of the actual contour examined from the nominal contour of the workpiece 16.

Figure 7:
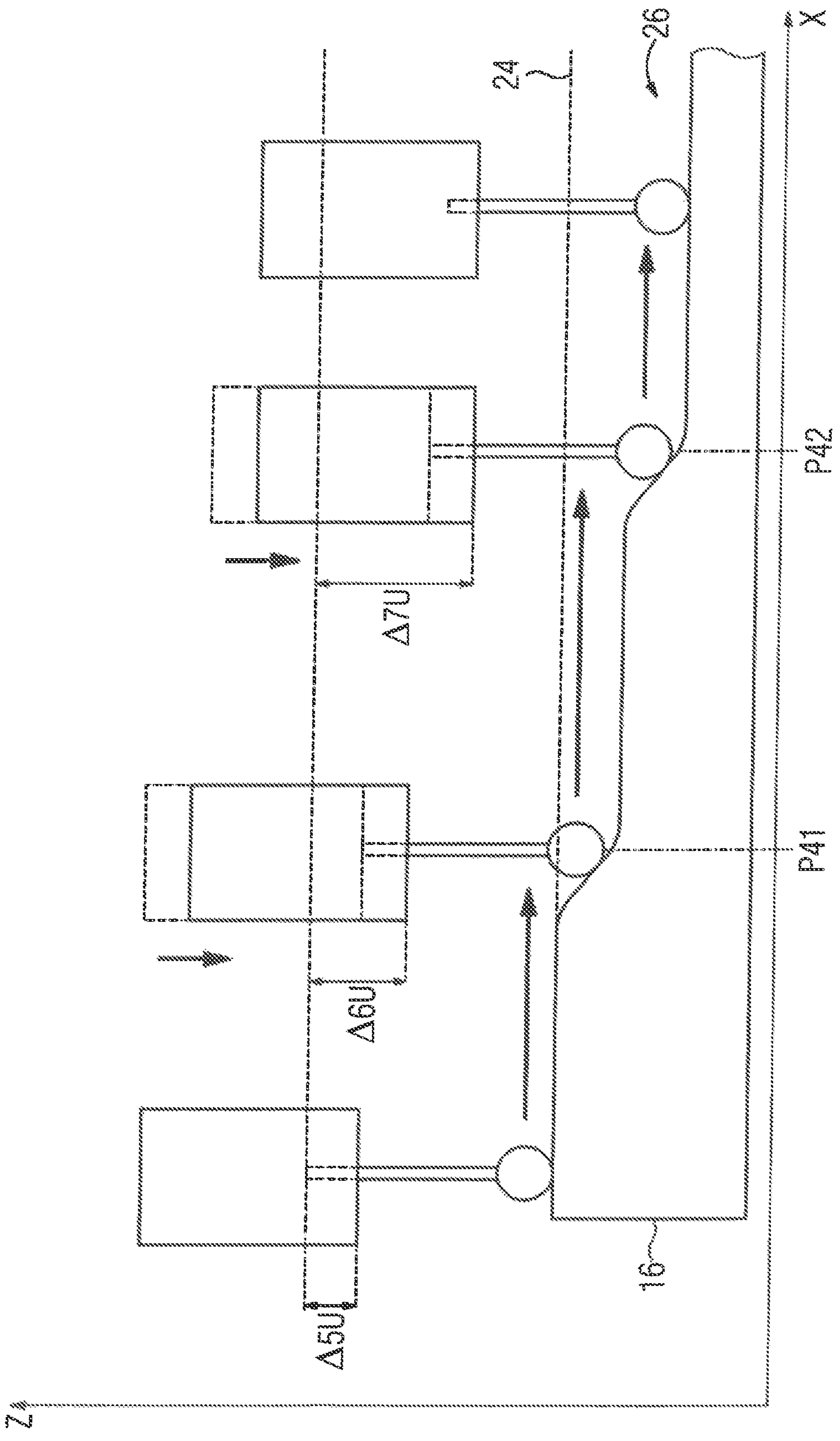
FIG. 7 shows the determination of an undersize.

The method shown in the exemplary embodiment in accordance with FIGS. 6A to 6D for determination of an oversize can by analogy also be used for determination of an undersize, as is explained below with the aid of FIG. 7.

As described previously in conjunction with FIG. 3, here too the measuring sphere 22 is first of all moved toward the surface of the workpiece 16 and a deflection value Δ5U is set, by which the touch probe 21 after a contact identified (by the switching signal generated by the touch probe 21) will be further deflected. Here too a fifth deflection path, which runs, offset by the deflection value Δ5U, "below" the nominal contour 24 within the workpiece 16, is first of all specified to the measuring sphere 21. Subsequently in this exemplary embodiment too, the touch probe 21 deflected by the deflection value Δ5U again moves from left to right over the surface of the workpiece 16, until such time as, in the area of the depression 26, the undersize exceeds the deflection value Δ5U and the touch probe 21 loses its switching signal, in the exemplary embodiment at the position P41. Subsequently the touch probe 21 is deflected automatically by the deflection value Δ6U stored in the CNC controller 3 in relation to the required value in the direction of the workpiece surface (Z direction) and the CNC controller determines a sixth deflection path, which is specified to the measuring sphere 22 as the track. The touch probe 21 is now moved further with the now predetermined track from left to right along the nominal contour 24, until the touch probe 21 loses its switching signal again at the position P42. Similarly to FIG. 6, here too the last-mentioned method steps are repeated again until such time as the measuring signal of the touch probe 21 is no longer lost. Here too the last deflection value set (in the exemplary embodiment Δ7U) determines the size of the deviation (undersize) of the actual contour from the nominal contour of the workpiece 16.

Advantageously, the machining of the workpiece 16 and the subsequent measurement with the aid of a digital twin of the machine tool system 1, which also comprises a digital twin of the touch probe 21, can be simulated in a suitable simulation environment. For this the CAD/CAM system 5, in particular connected via the network 4 to the CNC controller 3, is suitable. Thus for example, even before the actual measurement of the workpiece, a check can be made as to whether the areas of the surface of the workpiece 16 intended for the measurement are accessible at all to the touch probe 21. Advantageously suitable distance and deflection paths can thus be established and checked.

Figure 8:
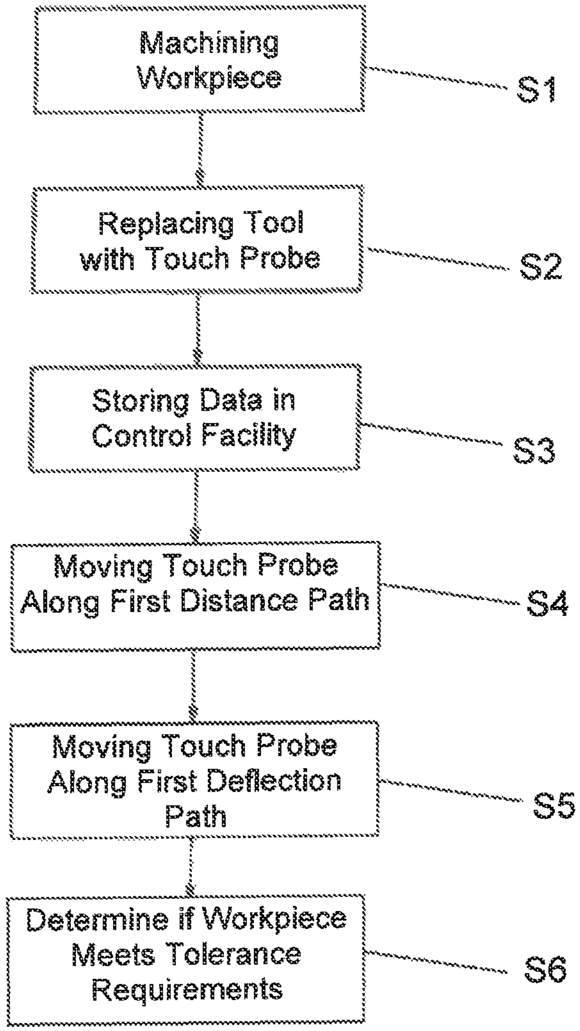
FIG. 8 shows method steps when an inventive method is being carried out.

The main method steps, when carrying out an inventive method, will be explained once again below in the form of a flow diagram in accordance with FIG. 8, wherein here too the reader is once again referred to the preceding figures.

In a first method step S1 a workpiece 16 is clamped into a workpiece receptacle (workpiece holder 15) of a machine tool 2 and machined by means of a tool 13 clamped into a tool spindle 11 or a tool holder 12 of the machine tool 2. To do this position-controlled axes (X, Y, Z, B, C) of the machine tool 2 are driven and thereby the tool 13 is moved relative to the workpiece 16. The position-controlled axes (X, Y, Z, B, C) are controlled by means of a control facility, in particular by a numerical or CNC controller 3, which processes a predetermined program (parts program) for this purpose.

In a second method step S2 the tool 13 is removed and a touch probe 21 is clamped into the machine tool 2, in particular into the tool spindle 11 or the tool holder 12, wherein the touch probe 21 involves a tactile switching touch probe, which has a shaped probe element, in particular a measuring sphere 22 or a measuring tip, at its end facing towards the workpiece 16. The workpiece 16 machined in method step S1 and now to be measured is already located in the workpiece receptacle (workpiece holder 15) of the machine tool 2. Re-clamping (transfer of the workpiece 16 into a measuring machine) is thus not necessary.

Similarly to the tool 13, the touch probe 21 can thus also be driven or positioned relative to the workpiece 16 by at least one position-controlled axis (X, Y, Z, B, C) of the machine tool 2.

The tactile switching touch probe 21 further delivers a switching signal, as soon as the shaped probe element 22 touches an object, in particular the workpiece 16 and does not deliver a switching signal when the shaped probe element 22 does not touch an object.

In a third method step S3 data, with regard to a nominal contour 24 of the workpiece 16 for at least one area of the surface of the workpiece 16, a first distance value Δ1A as well as a first deflection value Δ1U, is stored in a control facility 3 assigned to the machine tool 2. The control facility 3 then establishes, from the data with regard to the nominal contour 24, the distance value Δ1A and the deflection value Δ1U, at least one first distance path as well as at least one first deflection path, which are each spaced away from the nominal contour 24 by the distance value Δ1A or by the deflection value Δ1U.

In a fourth method step S4, the control facility 3 specifies to the at least one position-controlled axis X, Y, Z, B, C required values in such a way that the shaped probe element 22 moves along the first distance path spaced away from the nominal contour 24 relative to the workpiece 16 by the first distance value Δ1A. If, due to a deviation between the nominal contour 24 and the actual contour of the workpiece 16 this results in a contact between the touch probe 21, in particular the measuring sphere 22, and the workpiece surface, then a switching signal is generated at the touch probe 21 and supplied to the control facility 3, which thereby detects an oversize of the workpiece 16 in the measured area of the workpiece surface.

In a fifth method step S5 the control facility 3 specifies required values to the at least one position-controlled axis X, Y, Z, B, C in such a way that the shaped probe element (measuring sphere 22) would move along the first deflection path spaced apart from the nominal contour 24 relative to the workpiece by the first deflection value Δ1U, in such a way that it would penetrate into the workpiece 16. Since however a penetration of the touch probe 21 into the workpiece 16 is not intended or possible, the touch probe 21, in particular the shaped probe element (the measuring sphere 22) ideally deflected by the deflection value Δ1U and thus in contact with the workpiece 16, moves along the surface of the workpiece 16. If, due to a deviation between the nominal contour 24 and the actual contour of the workpiece 16 during this movement this results in an end of the contact between the touch probe 21 (in particular the measuring sphere 22) and the workpiece surface, then the touch probe 21 loses its switching signal, which is registered by the control facility 3, which thereby detects an undersize of the workpiece 16 in the measured area of the workpiece surface.

If the control facility 3 does not establish either an oversize in method step S3 or an undersize in method step S5, then in a method step S6 the control facility 3 identifies that the workpiece 16, at least in the area of the nominal contour 24 examined, meets the tolerance requirements predetermined by the first distance value Δ1A and the first deflection value Δ1U or otherwise does not meet the predetermined tolerance requirements. Where necessary the control facility 3 outputs a corresponding message to a user of the machine tool 2 or of the control facility 3.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for checking a contour of a workpiece, the method comprising:

clamping into a machine tool a switching touch probe having a shaped probe element at an end facing the workpiece;

positioning the shaped probe element relative to the workpiece by at least one position-controlled axis of the machine tool;

storing in a control facility connected to the machine tool data relating to a nominal contour of the workpiece for at least one area of a surface of the workpiece, a first distance value characteristic of a distance between the shaped probe element and the nominal contour, as well as a first deflection value characteristic of a deflection of the touch probe upon contact with the surface of the workpiece;

the control facility establishing, from the data relating to the nominal contour, the distance value and the deflection value, as a movement path of the shaped probe element a first distance path and a first deflection path;

selecting the first distance path as the movement path and moving the shaped probe element along the first distance path; and determining with the control facility a violation of the nominal contour and generating a switching signal when the shaped probe element, upon moving along the first distance path, contacts the workpiece at least at one point along the first distance path; and/or selecting the first deflection path as the movement path and moving the shaped probe element along the first deflection path; and determining with the control facility a violation of the nominal contour and not generating the switching signal when the shaped probe element, upon moving along the first deflection path, fails to contact the workpiece.

2. The method of claim 1, wherein the checking of the contour is preceded by a machining of the workpiece by the machine tool.

3. The method of claim 1, wherein the shaped probe element comprises a measuring sphere, a measuring cylinder or a measuring tip.

4. The method of claim 1, wherein the first distance value and the first deflection value are identical.

5. The method of claim 1, wherein the first distance value or the first deflection value, or both, are set in relation to a predetermined direction.

6. The method of claim 1, wherein the first distance value or the first deflection value, or both, are set in relation to a surface normal of the nominal contour of the workpiece along the established first distance path or first deflection path.

7. The method of claim 1, wherein the first distance path is traversed in a positive path direction, whereafter the first deflection path is traversed in a negative path direction.

8. The method of claim 1, further comprising moving the touch probe along the nominal contour several times along a plurality of the predetermined deflection paths at different distances having different distance values between the surface of the workpiece and the shaped probe element.

9. The method of claim 1, wherein the touch probe is deflected toward the nominal contour and traverses the nominal contour several times along a plurality of the predetermined deflection paths with different deflections having different deflection values.

10. The method of claim 8, wherein the distance values decrease between consecutive moves.

11. The method of claim 9, wherein the deflection values decrease between consecutive moves.

12. The method of claim 1, further comprising increasing the distance between the shaped probe element and the nominal contour when the shaped probe element, while moving along the first distance path with a first distance defined by the first distance value, contacts the workpiece at a point along the first distance path, to a predetermined second distance value, and moving the shaped probe element along a second distance path with the distance determined by the second distance value.

13. The method of claim 12, further comprising increasing the distance between the shaped probe element and the nominal contour to a further predetermined distance value upon each further contact between the shaped probe element and the workpiece, and moving the shaped probe element along a further distance path with the distance determined by the further distance value, to the nominal contour until an end of the nominal contour to be traversed is reached.

14. The method as claimed in claim 13, wherein a last distance value is stored as an oversize of the workpiece.

15. The method of claim 1, further comprising moving the touch probe along the first deflection path to trace the nominal contour with a defined first deflection value, and when the switching signal is lost at a first point of the nominal contour, increasing the first deflection value to a predetermined second deflection value and traversing the nominal contour with a deflection of the touch probe defined by the second deflection value.

16. The method of claim 15, further comprising increasing the deflection of the touch probe in relation to the nominal contour to a further predetermined deflection value upon each further loss of the switching signal, and traversing the nominal contour further with the deflection defined by the further predetermined deflection value until an end of the nominal contour to be traversed is reached.

17. The method of claim 16, wherein a last deflection value is stored as an undersize of the workpiece.

18. A machine tool system configured to check a contour of a workpiece, the machine tool system comprising a machine tool configured to machine the workpiece;

a switching touch probe comprising a shaped probe element clamped in a tool receptacle of the machine tool at an end facing the workpiece, with the shaped probe element to be positionable relative to the workpiece by at least one position-controlled axis of the machine tool; and a control facility connected to the machine tool and configured to store data relating to a nominal contour of the workpiece for at least one area of a surface of the workpiece, a first distance value characteristic of a distance between the shaped probe element and the nominal contour, as well as a first deflection value characteristic of a deflection of the touch probe upon contact with the surface of the workpiece;

establish, from the data relating to the nominal contour, the distance value and the deflection value, as a movement path of the shaped probe element a first distance path and a first deflection path, select the first distance path as the movement path and moving the shaped probe element along the first distance path; and determine a violation of the nominal contour and generating a switching signal when the shaped probe element, upon moving along the first distance path, contacts the workpiece at least at one point along the first distance path; and/or select the first deflection path as the movement path and moving the shaped probe element along the first deflection path; and determine a violation of the nominal contour and not generating the switching signal when the shaped probe element, upon moving along the first deflection path, fails to contact the workpiece.

19. A digital twin of a machine tool system as set forth in claim 18 for simulating the check of the contour.

* * * * *